United States Patent [19]

Betteridge

[11] Patent Number: 4,725,093
[45] Date of Patent: Feb. 16, 1988

[54] VEHICLE ROOF OPENING MECHANISM

[75] Inventor: Timothy D. Betteridge, Erdington, England

[73] Assignee: Britax Weathershields Limited, Birmingham, England

[21] Appl. No.: 2,964

[22] Filed: Jan. 13, 1987

[30] Foreign Application Priority Data

Jan. 18, 1986 [GB] United Kingdom ............... 8601207

[51] Int. Cl.⁴ .............................. B60J 7/11; B60J 7/19
[52] U.S. Cl. .................................... 296/223; 296/218; 296/224; 49/341; 292/212
[58] Field of Search ............... 296/216, 218, 223, 224; 49/340, 341; 292/212, 199

[56] References Cited

U.S. PATENT DOCUMENTS

| 3,979,148 | 9/1976 | Martin | 296/218 X |
| 4,260,189 | 4/1981 | Periou et al. | 296/223 |
| 4,645,259 | 2/1987 | Dufft | 296/223 |

FOREIGN PATENT DOCUMENTS

| 0000455 | 1/1979 | European Pat. Off. | |
| 3045363 | 7/1982 | Fed. Rep. of Germany | 296/223 |
| 3324949 | 1/1985 | Fed. Rep. of Germany | 296/218 |
| 16610 | of 1889 | United Kingdom | 49/341 |
| 315564 | 7/1929 | United Kingdom | |
| 595485 | 12/1947 | United Kingdom | |
| 1091528 | 11/1967 | United Kingdom | |
| 2153005 | 8/1985 | United Kingdom | |

*Primary Examiner*—Dennis H. Pedder
*Attorney, Agent, or Firm*—Hayes, Davis & Soloway

[57] ABSTRACT

A vehicle roof with a roof opening which can be closed by a panel which is pivotable about its front edge. A strut, with a rack on one side, has one end pivotally attached to the rear edge of the panel. A geared shaft is mounted on the underside of the vehicle roof and engages with the rack to raise and lower the rear edge of the panel. The shaft is spring biased into geared engagement at separate locations along its length. Stop formations adjacent to the end of the strut opposite to that which is attached to the roof panel are engaged by a blocking lever to prevent movement of the strut beyond the range of positions in which the geared shaft can engage with the rack.

3 Claims, 5 Drawing Figures

VEHICLE ROOF OPENING MECHANISM

This invention relates to a vehicle roof with a roof opening which can be closed by an openable and removable panel, the panel being pivotable about an axis located in the vicinity of its front edge at right angles to the longitudinal axis of the vehicle, so as to be movable between a position in which it closes the roof opening and a position in which its rear edge is raised above the level of the vehicle roof.

According to the invention, a vehicle roof has a roof opening, a panel pivotable about an axis located in the vicinity of its front edge at right angles to the longitudinal axis of the vehicle between a position in which it closes the roof opening and a position in which its rear edge is raised above the level of the vehicle roof, a strut having one end pivotally attached to the underside of the panel adjacent to its rear edge, a rack comprising a series of uniformly spaced gear teeth formed on a side edge of the strut, a gear wheel rotatably mounted on the underside of the vehicle roof adjacent to the rear edge of the roof opening, guide means for retaining the rack in driving engagement with the gear wheel, drive means for effecting rotation of the gear wheel, stop means adjacent to the end of the strut opposite to that which is attached to the roof panel, and a blocking lever pivotally mounted on the underside of the vehicle roof adjacent to the gear wheel and resiliently biased into a blocking position in which it is engageable with the stop means to prevent movement of the strut beyond the range of positions in which the gear wheel can engage with the rack, the blocking lever being manually displaceable into a release position allowing the stop means to pass.

Thus the rack can be disengaged from the gear wheel so as to allow the panel to be removed from the vehicle roof only if the blocking lever is held in its displaced position. As a further safety precaution, it is preferable to provide second stop means, closer to the end of the strut than the first stop means. In order to disengage the strut it is then necessary, while holding the lever in its release position, first to rotate the drive member so as to drive the strut to a position in which the pinion is disengaged from the rack and then to manually further raise the rear edge of the panel to move the second stop means beyond the position in which it can be blocked by the lever. Any attempt to raise the panel manually before the first stop projection has cleared the lever will be resisted by the gear wheel which is then still in engagement with the rack.

Preferably the guide means comprises spring means arranged to engage with the strut so as to bias the rack thereon into engagement with the gear wheel.

In one form of the invention, the gear wheel comprises a pinion mounted with its axis horizontal and the drive means comprises a worm wheel mounted with its axis vertical so as to engage with the pinion and a manually operable drive member fast with the worm wheel. Preferably, spring means engages with the axis of the pinion so as to bias it into engagement with the worm wheel.

An embodiment of the invention will now be described, by way of example, with reference to the accompanying drawings, in which.

Figure 1:
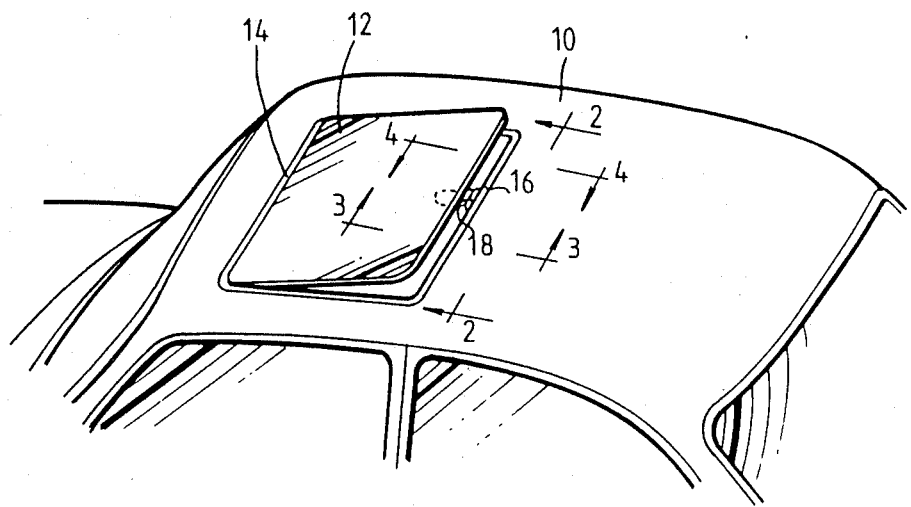
FIG. 1 is a perspective view of a top of a motor car fitted with an opening roof of the type preferred to a bar, having a frame surrounding the roof opening and with the panel in the open position.
Figure 2:
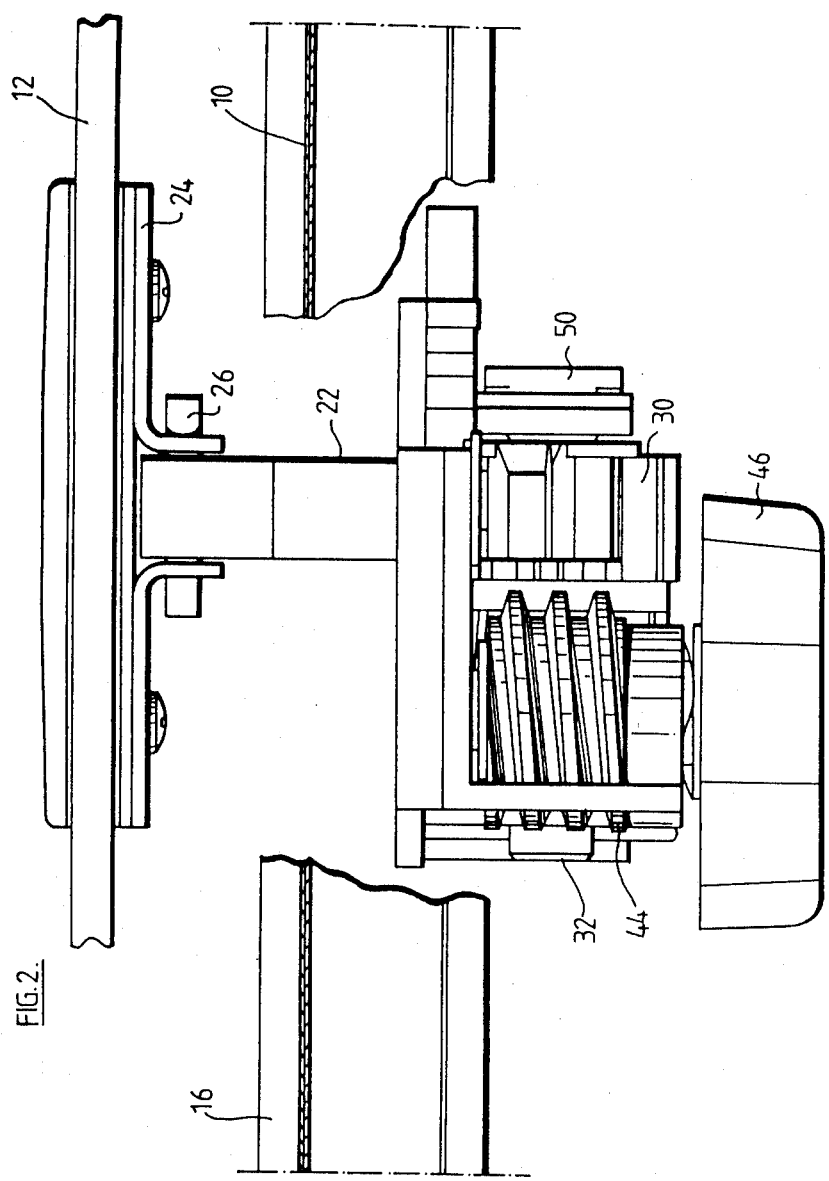
FIG. 2 is a partially broken away cross sectional view taken on the line 2—2 in FIG. 1.
Figure 3:
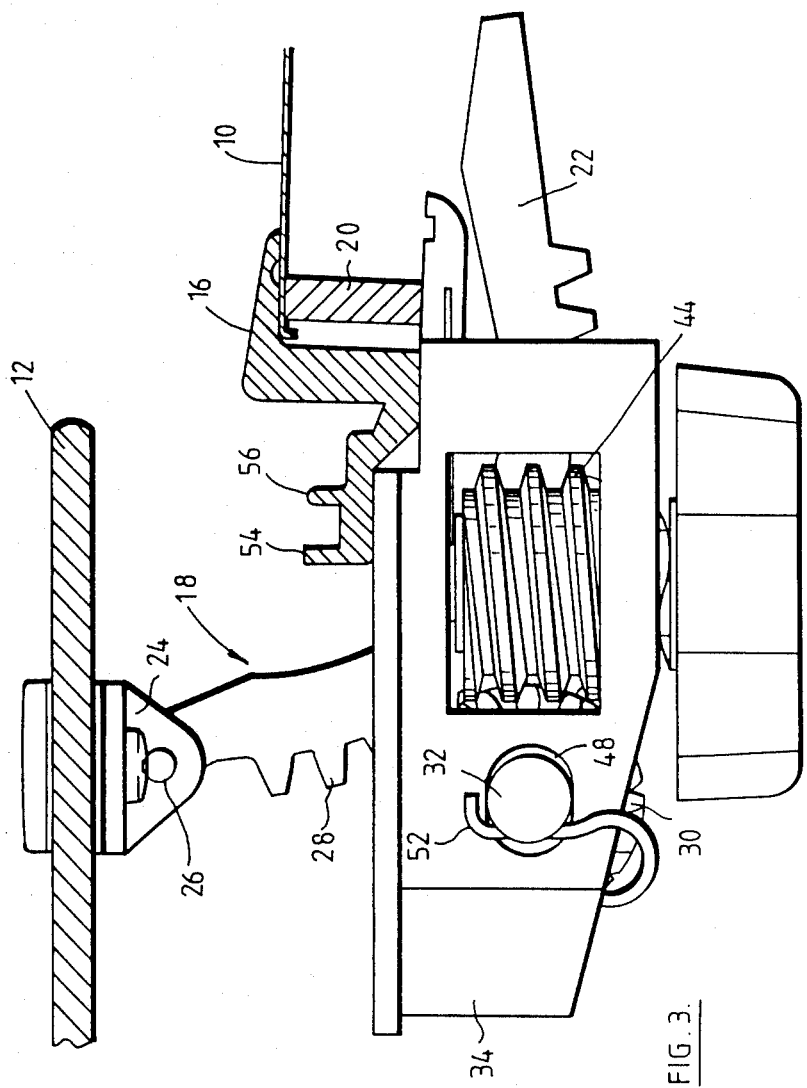
FIG. 3 is a cross sectional view taken on the line 3—3 in FIG. 1.
Figure 4:
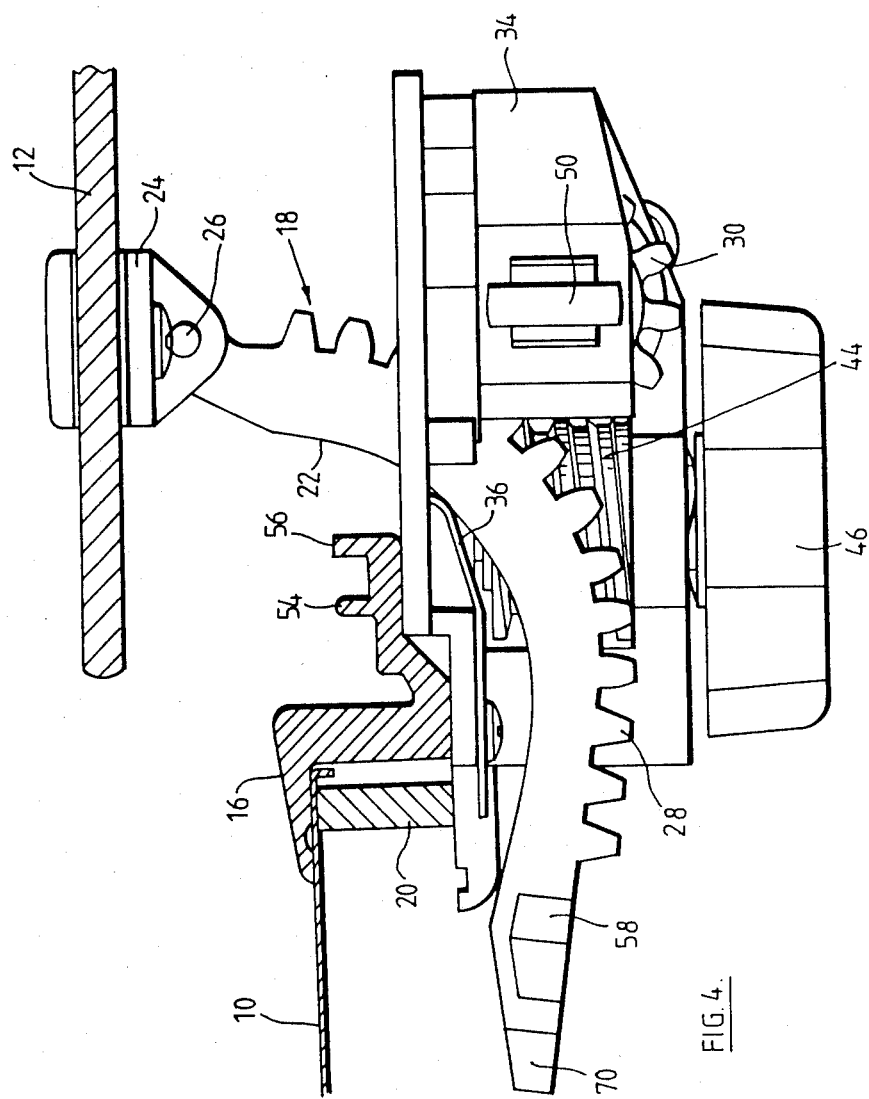
FIG. 4 is a cross sectional view taken on the line 4—4 in FIG. 1.
Figure 5:
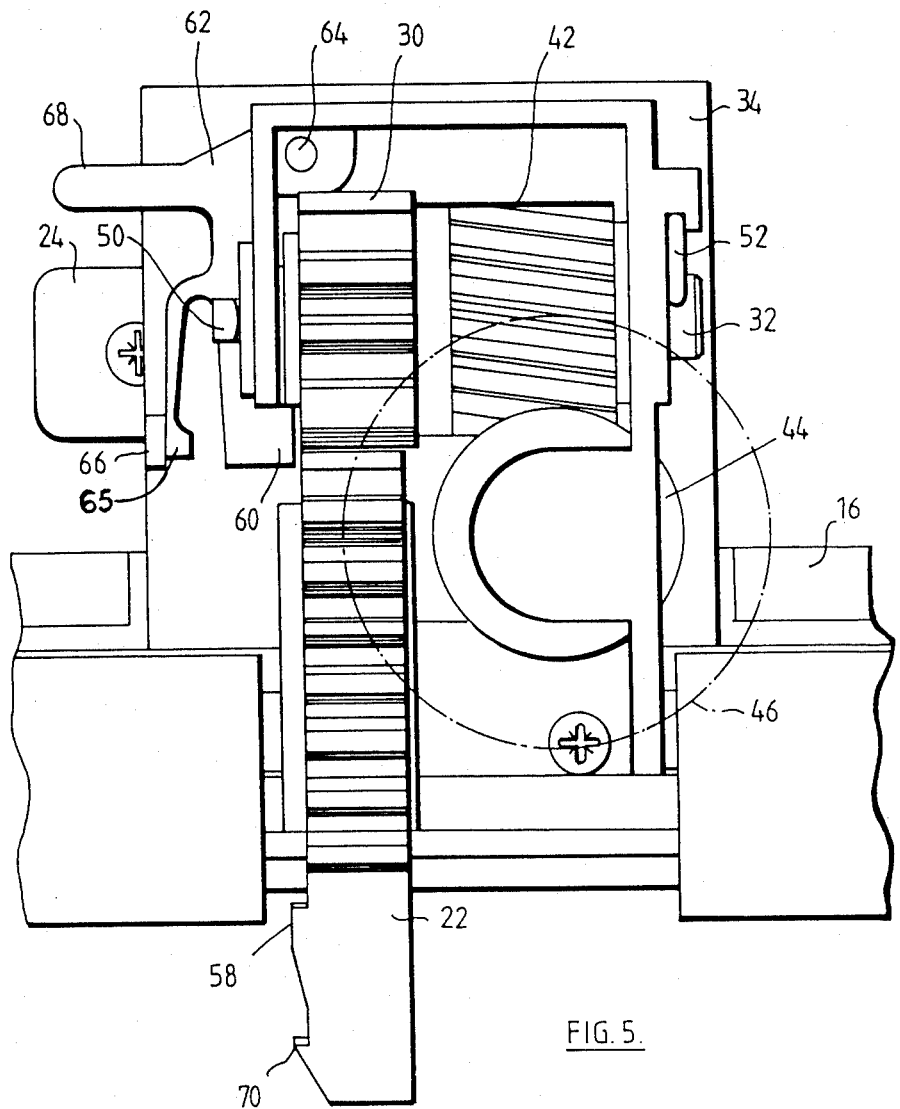
FIG. 5 is a partly schematic plan view from below of the mechanism illustrated in FIGS. 2 to 4.

Referring to FIG. 1, roof 10 of a motor vehicle has an opening which is filled by panel 12 hinged along its leading edge 14 to a frame 16 which bounds the opening. An opening mechanism 18 at the rear of the panel 12 is arranged to hold the panel 12 in a fully open position as illustrated, in a fully closed position in which the panel 12 is level with the vehicle roof 10 and in a continuous range of intermediate positions between the closed position and the fully open position. The hinges (not shown) at the leading edge 14 of the panel 12 are constructed to allow the panel 12 to be disengaged from the frame 14 when the panel 12 is tilted beyond its fully open position illustrated in FIG. 1. A clamping ring 20 (FIGS. 3 to 5), secured to the bottom edge of the frame 16, engages with the underside of the vehicle roof 10 so as to hold the frame 16 in firm engagement therewith.

Referring to FIGS. 2 to 5, the opening mechanism 18 comprises an arcuate strut 22 which is attached at one end to a bracket 24 attached to the underside of the roof panel 12 by means of a pivot pin 26. The strut 22 has a toothed rack 28 formed on its radially outer edge, the rack 28 engaging with a pinion 30 which is journalled on a shaft 32. The shaft 32 is mounted on a bracket 34 which is secured to the frame 16 so as to project into the roof opening at approximately the central position along the rear edge thereof. A leaf spring 36 (FIG. 4), secured to the frame 16 adjacent to the bracket 34 engages with the radially inner edge of the arcuate strut 22 so as to bias the rack 28 into engagement with the pinion 30.

Also journalled on the shaft 32 and secured fast with the pinion 30 is a second pinion 42 which is engaged by a worm wheel 44 mounted on the bracket 34 with its axis vertical. A manually operable drive knob 46 is mounted fast with the worm wheel 44 below the bottom of the bracket 34 so as to be accessible from the inside of the vehicle. In order to ensure rattle-free engagement between the worm wheel 44 and the pinion 42, the end of the shaft 32 nearer to the pinion 42 is mounted in a slot 48 in the bracket 34 which is oriented to permit limited movement of the pinion 42 radially with respect to the axis with the worm wheel 44, the mounting 50 at the other end of the shaft 32 being constructed to allow limited pivotal movement. A spring 52, mounted on the bracket 34 adjacent to the slot 48, engages with the end of the shaft 32 to bias the pinion into engagement with the worm wheel 44.

In use, rotation of the knob 46 causes the worm wheel 44 to drive the pinion 42, which in turn causes the pinion 30 to drive the rack 28 so as to move it between a closed position, in which the pinion 30 engages with the end of the rack 28 nearer to the pivot pin 26 and the panel 12 is in engagement with seal projections 54 and 56 on the frame 16, and a fully open position in which the pinion 30 engages with the end of the rack 28 further from the pivot pin 26 and the panel 12 is disposed in the position illustrated in FIG. 1.

In order to prevent the knob 46 being rotated sufficiently to drive the pinion 30 off the end of the rack further from the pivot pin 26, a first stop projection 58 (FIGS. 4 and 5) is formed on a side face of the strut 22 so as to be engagable with a pawl tip 60 formed on a lever 62 which is mounted on a pivot pin 64 secured to the bracket 34. The lever 62 is formed from resilient plastics material and has an integral spring arm 65 which engages with a projection 66 on the bracket 34 to bias the pawl tip 60 into the positon illustrated. The lever 62 also has a limb 68 which projects beyond the edge of the bracket 34 where it can be engaged by a user's finger so as to displace the pawl tip 60 away from the strut 22 and out of the path of the stop member 58. The rear edge of the panel 12 can now be pushed up manually beyond the position illustrated in FIG. 1 but, unless the lever 62 is held in its displaced position, such upward movement is limited by engagement of the pawl tip 60 with a second stop projection 70 on the strut 22 beyond the first stop projection 58. Thus, in order to free the strut 22 completely, it is necessary first to hold the lever 62 in its displaced position while rotating the drive wheel 46 and then to continue to hold the lever 62 while manually lifting the rear edge of the panel. The rear edge of the panel can not be lifted manually until the rack 28 is clear of the pinion 30 because such movement would be resisted by the worm wheel 44. The risk of inadvertently disengaging the strut 22 is therefore very small.

I claim:

1. A vehicle roof having a roof opening, a panel pivotable about an axis located in the vicinity of its front edge at right angles to the longitudinal axis of the vehicle between a position in which it closes the roof opening and a position in which its rear edge is raised above the level of the vehicle roof, a strut having one end pivotally attached to the underside of the panel adjacent to its rear edge, a rack comprising a series of uniformly spaced gear teeth formed on a side edge of the strut, a shaft mounted on the underside of the vehicle roof adjacent to the rear edge of the roof opening with the axis of the shaft horizontal and one end thereof capable of limited translational movement perpendicular to its axis, first and second pinion means mounted fast with each other for simultaneous rotation on the shaft, guide means for retaining the rack in driving engagement with the first pinion means, a worm wheel mounted with its axis vertical so as to drive the pinion means, spring means engaging with the shaft so as to bias the second pinion means into engagement with the worm wheel, a manually operable drive member fast with the worm wheel, stop means adjacent to the end of the strut opposite to that which is attached to the roof panel, and a blocking lever pivotally mounted on the underside the vehicle roof adjacent to the shaft and resiliently biased into a blocking position in which it is engageable with the stop means to prevent movement of the strut beyond the range of positions in which the first pinion means can engage with the rack, the blocking lever being manually displaceable into a release position allowing the stop means to pass.

2. A vehicle roof according to claim 1, wherein the guide means comprises spring means arranged to engage with the strut so as to bias the rack thereon into engagement with the first pinion means.

3. A vehicle roof according to claim 1, having second stop means, closer to the opposite end of the strut than the first mentioned stop means.

* * * * *